United States Patent
Okuno et al.

(10) Patent No.: US 7,804,399 B2
(45) Date of Patent: Sep. 28, 2010

(54) DISPLAY APPARATUS

(75) Inventors: Kiyokazu Okuno, Okazaki (JP);
Yoshiki Ohzawa, Chita-gun (JP);
Toshikazu Yokota, Kariya (JP);
Kazutomo Tsuchikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 325 days.

(21) Appl. No.: 12/073,044

(22) Filed: Feb. 28, 2008

(65) Prior Publication Data

US 2008/0211693 A1    Sep. 4, 2008

(30) Foreign Application Priority Data

Mar. 1, 2007 (JP) ............................. 2007-051980
Mar. 19, 2007 (JP) ............................. 2007-071043

(51) Int. Cl.
  *B60Q 1/00* (2006.01)
(52) U.S. Cl. .................... 340/461; 340/425.5; 340/438; 340/995.26
(58) Field of Classification Search ............. 340/425.5, 340/438, 995.1–995.26, 461; 345/1.3, 31
See application file for complete search history.

(56) References Cited

U.S. PATENT DOCUMENTS

2003/0128103 A1  7/2003  Fitzpatrick et al.

FOREIGN PATENT DOCUMENTS

| DE | 197 28 470 | 1/1999 |
|---|---|---|
| DE | 101 32 948 | 1/2003 |
| DE | 10 2005 017 556 | 10/2006 |
| JP | A-05-024485 | 2/1993 |
| JP | A-10-038593 | 2/1998 |
| JP | A-2001-272243 | 10/2001 |
| JP | A-2004-125808 | 4/2004 |
| JP | A-2005-227295 | 8/2005 |
| JP | A-2005-241559 | 9/2005 |
| JP | A-2005-274192 | 10/2005 |

OTHER PUBLICATIONS

Office Action dated Jan. 6, 2009 in corresponding JP application No. 2007-071043 (and English Translation).
Office Action dated Jan. 6, 2009 in corresponding JP application No. 2007-051980 (and English Translation).
Office Action dated Jun. 20, 2008 in corresponding German patent application No. 10 2008 011 876.1 (and English translation).

*Primary Examiner*—Brent Swarthout
(74) *Attorney, Agent, or Firm*—Posz Law Group, PLC

(57) ABSTRACT

A controller of a navigation apparatus acquires audio information when it is determined in a display switch process that a display of a display device is stored in a center console portion. An audio information image is generated from the acquired audio information. The generated audio information image is displayed on an exposed portion of a viewing area of the display. Even if the viewing area of the display is partially concealed by the center console portion, an exposed portion of the viewing area, which is not concealed by the center console portion, is effectively used. Useful information image such as an audio information image other than a usual navigation information image can be thus provided in the partially exposed portion of the viewing area of the display.

5 Claims, 5 Drawing Sheets

USUAL IMAGE AT FULLY EXPOSED POSITION

AUDIO IMAGE AT PARTIALLY CONCEALED POSITION

USUAL IMAGE AT FULLY EXPOSED POSITION

TURN BY TURN IMAGE AT PARTIALLY CONCEALED POSITION

DISPLAY APPARATUS

CROSS REFERENCE TO RELATED APPLICATION

This application is based on and incorporates herein by reference Japanese Patent Applications No. 2007-51980 filed on Mar. 1, 2007 and No. 2007-71043 filed on Mar. 19, 2007.

FIELD OF THE INVENTION

The present invention relates to a display apparatus to provide, in proximity to a driver, visual information outputted by a navigation apparatus or the like.

BACKGROUND OF THE INVENTION

A navigation apparatus as a display apparatus outputs visual information such as map information, route information, or facility information. The visual information is displayed on a display such as a liquid crystal display arranged in a console box of the vehicle to thereby notify the driver (e.g., refer to Patent document 1).

Such a display apparatus includes a movable display which is a liquid crystal display able to be stored in a dashboard or a center console portion.

Patent document 1: JP-H05-24485 A

Here, when the display is stored (i.e., in a storage state) in an instrument panel or the like, the viewing area is partially concealed. This involves a problem that part of display information such as a map for navigating is concealed or a problem that a function may be disabled in the storage state.

SUMMARY OF THE INVENTION

It is an object to provide a display apparatus in which even if a viewing area of a display is partially concealed by a center console portion, useful information can be provided using an exposed portion of the viewing area.

According to an example of the present invention, a display apparatus for a vehicle is provided as follows. A display is provided to include a viewing area able to display an image, the display being movable between (i) a partially concealed position at which the viewing area is partially concealed inside a center console portion of the vehicle and (ii) a fully exposed position at which a whole of the viewing area is exposed from the center console portion. A movement drive device is configured to move the display between the partially concealed position and the fully exposed position. A position switch unit is configured to cause the movement drive device to switch to move the display between the partially concealed position and the fully exposed position according to a control signal. An information acquisition unit is configured to acquire notifying information. An image generation unit is configured to generate a first image and a second image from the acquired notifying information, the first image being displayed on the whole of the viewing area at the fully exposed position, the second image being displayed on an exposed portion of the viewing area at the partially concealed position. A notification unit is configured to cause the display to display the first image on the viewing area at the fully exposed position and the second image on the exposed portion of the viewing area at the partially concealed position.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An embodiment according to the present invention will be explained with reference to drawings. In addition, the embodiment of present invention can be modified in various manners within a technical scope of the present invention without being limited to the following embodiments.

First Embodiment

Configuration

Figure 1:
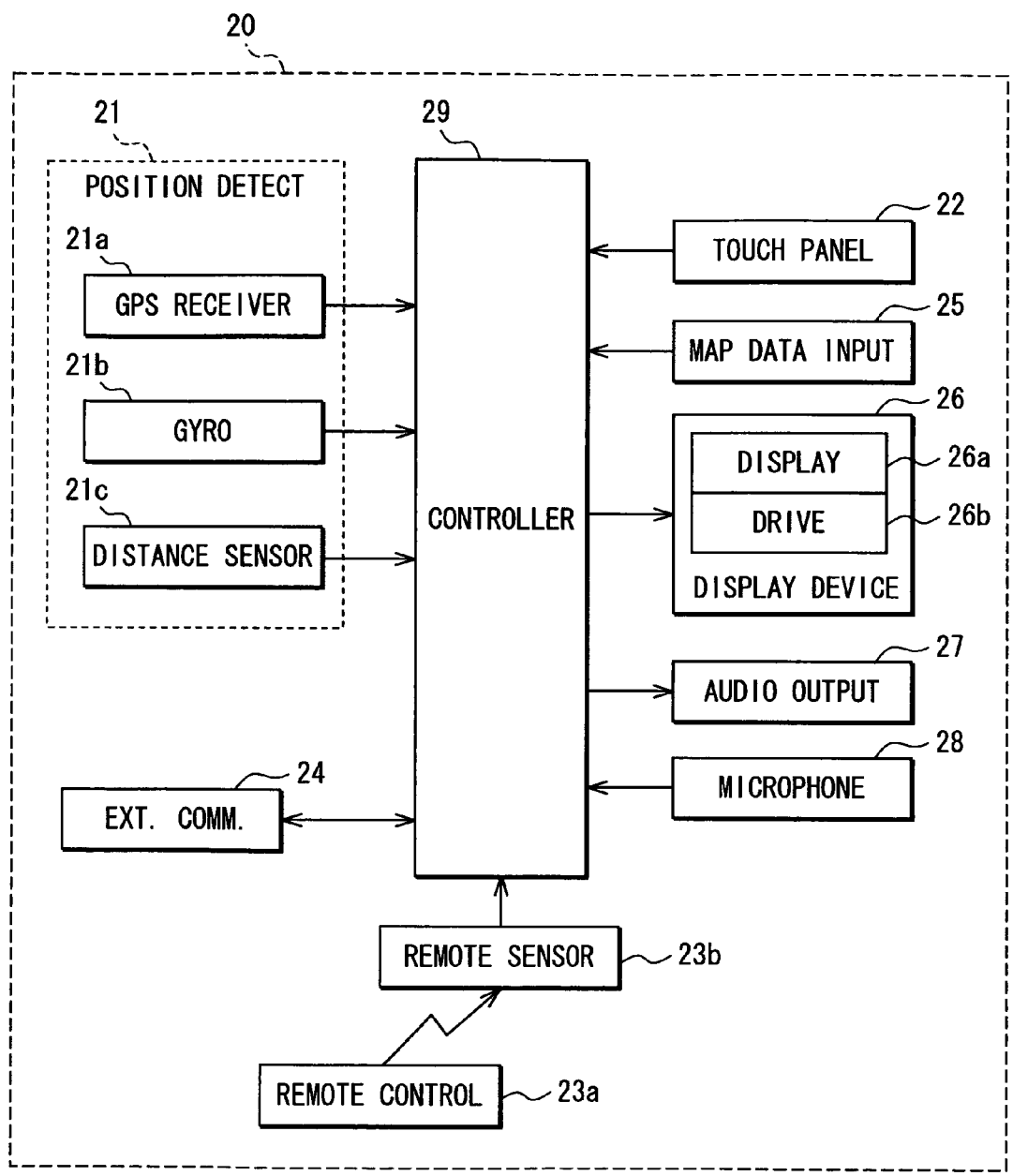
FIG. 1 is a block diagram showing a configuration of a navigation apparatus according to a first embodiment of the present invention.

FIG. 1 is a block diagram illustrating a schematic configuration of a navigation apparatus 20 having a function of a map display apparatus according to a first embodiment of the present invention.

The navigation apparatus 20 is mounted in a subject vehicle. The navigation apparatus 20 includes the following: a position detection device 21 for detecting a present position of the vehicle; a touch panel 22 for inputting various instructions from a user; a remote control terminal 23a provided as a different body unit from the navigation apparatus 20 for inputting various instructions from a user like the touch panel 22; a remote control sensor 23b for inputting a signal from the remote control terminal 23a; an external communication device 24 connected with a packet communication network etc. for communicating with an outside of the vehicle; a map data input device 25 for inputting data from a map storage medium recording map data or audio data; a display device 26 for displaying a map or a variety of information; an audio output device 27 for outputting various kinds of guidance sounds; a microphone 28 for outputting an electric signal based on a sound uttered by a user; and a controller 29. The controller 29 executes various processing according to inputs from the position detection device 21, the touch panel 22, the remote control sensor 23b, the external communication device 24, the map data input device 25, and the microphone 28. The controller 29 controls the external communication device 24, the display device 26, and the audio output device 27.

The position detection device 21 includes the following sensors or the like: a GPS (Global Positioning System) receiver 21a for receiving via a GPS antenna (not shown) electric waves from satellites for GPS and outputs reception signals; a gyroscope 21b for detecting rotational movement exerted to the vehicle; and a distance sensors 21c for detecting a travel distance from an acceleration in a length direction of the vehicle. Based on signals outputted from the sensors or the like 21a to 21c, the controller 29 calculates a position, direction, speed, etc. of the vehicle. In addition, although there are several methods to calculate a present position based on a signal outputted from the GPS receiver 21a, an independent positioning method or a relative positioning method may be used.

The touch panel 22 includes a panel to output coordinates touched by a user and integrated with the display device 26 as a laminate integration. In addition, although there are various methods to detect a user's manipulation such as a pressure-sensitive method, an electromagnetic induction method, a capacitive sensing method, or a method combining the foregoing, any method may be used in the present embodiment.

The external communication device 24 acquires traffic information such as accident information or congestion information from a traffic information center such as a VICS (Vehicle Information Communication System) center via a light beacon, a radio wave beacon, etc. provided in road sides. The map data input device 25 is used for inputting various data stored in the map data storage medium such as a hard disk or DVD-ROM (none shown). The map data storage medium stores map data, audio data for guidance (audio guidance information), speech recognition data, etc. The map data includes node data, link data, cost data, background data, road data, name data, mark data, intersection data, facility data, etc. In addition, the data may be acquired through a communication network instead of acquiring the data from the map data storage medium.

The display device 26 includes a display (or called a display unit) 26a and a drive mechanism 26b. The display 26a is a color display, which can be a liquid crystal display, an organic electroluminescence display, or a CRT, or the like. The display 26a has in a central portion a viewing area (or called a display screen) which displays various information, for instance, information associated with a travel of the vehicle. The viewing area of the display 26a displays a map and associated data in superimposition. The associated data include the following: a present position mark indicating a present position of the vehicle, which is specified from the present position detected by the position detection device 21 and the map data inputted from the map data input device 25; a guide route to a destination; names; landmarks; facility marks; and facility guidance.

Figure 3A:
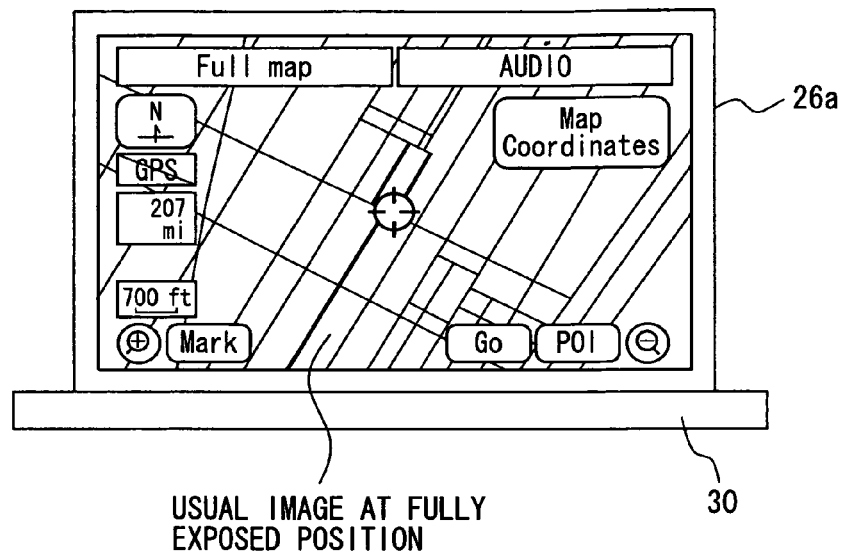
FIG. 3A is an example of an image in a display at a fully exposed position according to the first embodiment.
Figure 3B:
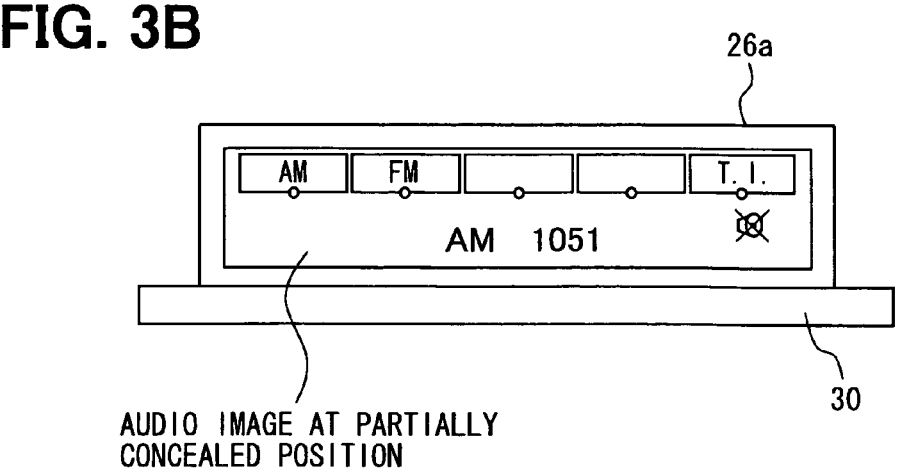
FIG. 3B is an example of an image in a display at a partially concealed position according to the first embodiment.

The display 26a is movable between (i) a "concealed position (partially concealed position)" in FIG. 3B and (ii) an "exposed position (fully exposed position)" in FIG. 3A. In the partially concealed position, a viewing area of the display 26a is partially concealed, in a storage state of the display 26a, inside the center console portion 30 of the vehicle, as shown in FIG. 3B. Here, an exposed portion of the viewing area can be defined as a portion of the viewing area exposed from the center console portion 30 without being concealed by the center console portion 30. In the fully exposed position, a whole of the viewing area of the display 26a is exposed, in an extension state of the display 26a, from the center console portion 30, as shown in FIG. 3A.

The drive mechanism 26b functions as a movement drive device and is controlled by the controller 29 to move the display 26a between the partially concealed position and the fully exposed position. Here, the drive mechanism 26b uses a well-known technology; therefore, a detailed explanation is omitted herein.

The audio output device 27 can output various audio guidance inputted from the map data input device 25. The microphone 28 outputs, to the controller 29, electric signal (sound signal) based on sounds (utterance or speeches) inputted by a user. By inputting various speeches into the microphone 28, the user can operate the navigation apparatus 20.

The controller 29 includes a known microcomputer having a CPU, ROM, RAM, SRAM, I/O, and a bus line connecting the foregoing. The controller 29 executes various processing based on programs stored in the ROM or RAM. For example, based on each detection signal from the position detection device 21, a present position of the vehicle is calculated as a group of coordinates and a heading direction; then, a map and associated items in proximity to the calculated present position are read out from the map data input device 25 and displayed in the display device 26. This can be called a map display process. An optimal route from the present position is calculated based on the map data stored in the map data input device 25 and a destination designated according to an input via the touch panel 22 or remote control terminal 23a. This can be called a route calculation process. Route guidance is performed by displaying the calculated optimal route in the display device 26 and/or by outputting corresponding audio guidance (or guidance speeches) via the audio output device 27. This can be called a route guidance process.

Further, the controller 29 has a function of moving or switching display positions of the display 26a between the partially concealed position (or the storage state) and the fully exposed position (or the extension state) by controlling the drive mechanism 26b in the display device 26 according to reception control signals. The reception control signals include an operation signal inputted via the touch panel 22 or the remote control terminal 23a, a control signal outputted by a speech recognition function using sound signals from the microphone 28, or a control signal such as a signal indicating a state of the main power of the navigation apparatus 20 or a state of the power of the display 26a. Thus, the controller 29 includes a position switch means or unit for the display 26a.

Moreover, the controller 29 has a function of acquiring information such as navigation information, vehicle information, and audio information, which can be used for notifying a user of the vehicle. The navigation information relates to a present information or route guidance and associated with a travel of the vehicle. The vehicle information and the audio information are additional information other than the navigation information and acquired from various external ECUs. Thus, the controller 29 includes an information acquisition means or unit such as a navigation information (or a first information) acquisition means or unit and an additional information (or a second information) acquisition means or unit. In addition, the navigation information includes guidance information indicating guidance with sounds (i.e., audio guidance).

The controller 29 thereby generates a first image to be displayed on the whole of the viewing area at the fully exposed position and a second image to be displayed on the exposed portion of the viewing area at the partially concealed position, for the display 26a of the display device 26. Thus, the controller 29 includes an image generation means or unit. The first image is a navigation information image (refer to FIG. 3A), which is generated from the navigation information and the generated first image is displayed on the whole of the viewing area at the fully exposed position. In contrast, the second image is an audio information image (refer to FIG. 3B), which is generated from the audio information and the generated second image is displayed on the exposed portion of the viewing area at the partially concealed position. Thus, the controller 29 includes a notification means or unit for displaying an image suitable for the display position taking place.

Operation

Figure 2:
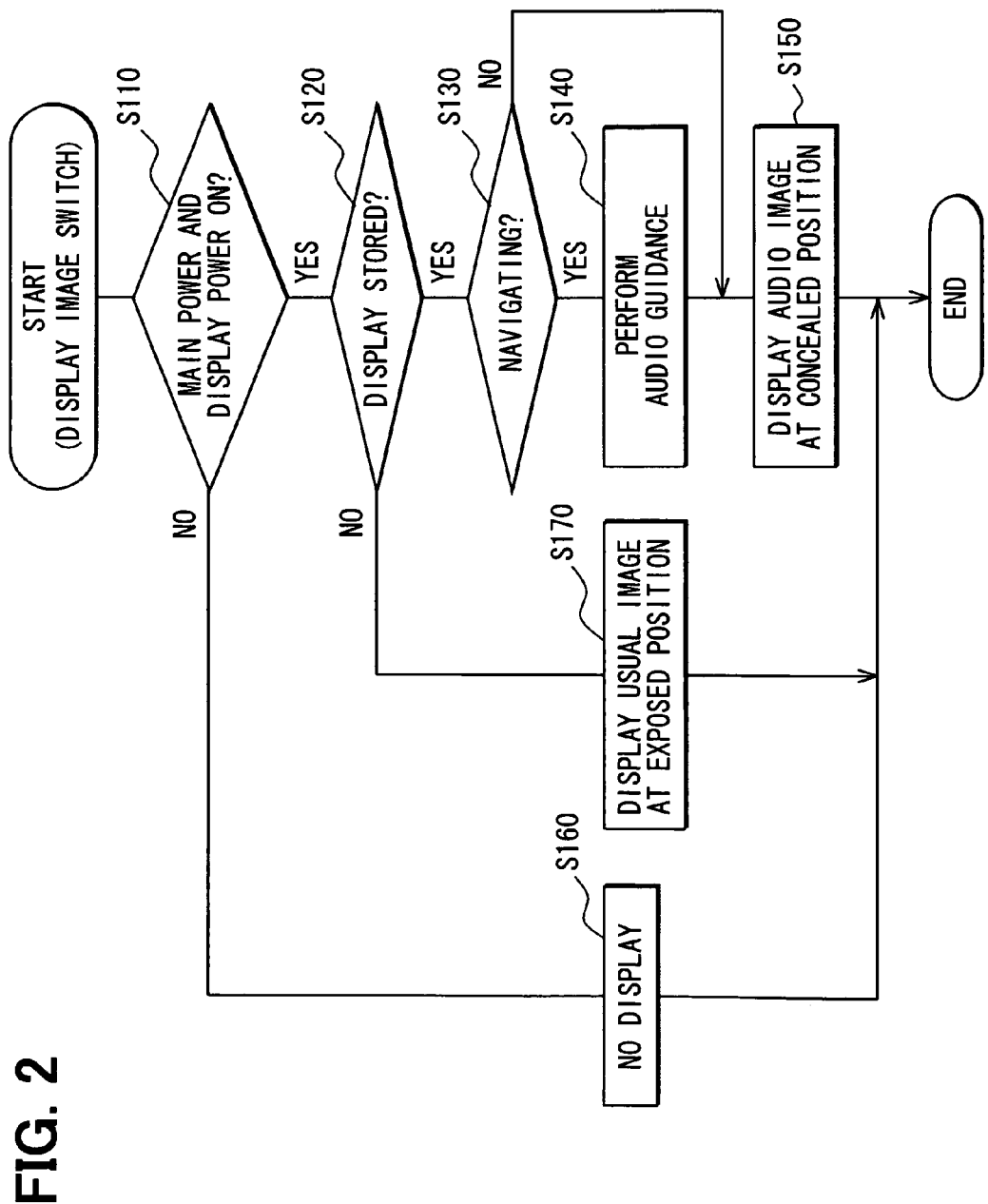
FIG. 2 is a flowchart explaining a display image switch process according to the first embodiment.

Next, a display image switch process executed by the controller 29 is explained using a flowchart of FIG. 2 and FIGS.

3A, 3B. Here, explanation is omitted about general processes such as the route calculation process and the route guidance process, which are also executed by the controller 29.

The display image switch process is executed by the controller 29, when an ignition key is operated by the driver to thereby generate a state of accessory electric power supply (ACC power supply). The process is repeatedly executed while the state of the accessory electric power supply is continued.

First, the controller 29 determines whether the main power of the navigation apparatus 20 and the power of the display 26a of the display device 26 are set to ON (S110). When the main power of the navigation apparatus 20 and the power of the display 26a are determined to be not set to ON, or when at least one of (i) the main power and (ii) the power of the display 26a is determined to be set to OFF (S110: NO), the controller 29 determines not to display any image on the display 26a (S160) and once ends the present process.

In contrast, when the main power of the navigation apparatus 20 and the power of the display 26a are determined to be set to ON (S110: YES), the controller 29 determines whether the display 26a of the display device 26 is stored in the center console portion 30 (i.e., in the storage state) (S120). Whether the display 26a is stored in the center console portion 30 is determined by detecting the position of the display 26a based on a signal indicating a drive state of the drive mechanism 26b or a signal outputted from a position sensor detecting the position of the display 26a.

When it is determined that the display 26a is not stored in the center console portion 30 (i.e., in the extension state instead of the storage state) and the whole of the viewing area of the display 26a is exposed (S120: NO), the controller 29 acquires navigation information. A navigation information image is generated from the acquired navigation information, and the generated navigation information image is displayed on the whole of the viewing area of the display 26a (S170).

Alternatively, at S170, the controller 29 may acquire audio information, generate an audio information image from the acquired audio information, and display the generated audio information image on the whole of the viewing area of the display 26a. Further, at S170, the controller 29 may acquire vehicle information, generate a vehicle information image from the acquired vehicle information, and display the generated vehicle information image on the whole of the viewing area of the display 26a. After S170, the present process is once ended.

In contrast, when the display 26a of the display device 26 is determined to be stored in the center console portion 30 (i.e., in the storage state) (S120:YES), the controller 29 determines whether navigation guidance takes place (S130). Whether navigation guidance takes place is determined when navigation information is outputted from a component included in the navigation apparatus 20.

When it is determined that navigation guidance does not take place (S130: NO), the controller 29 acquires audio information, generates an audio information image from the acquired audio information, and displays the generated audio information image on the exposed portion of the viewing area of the display 26a (S150) at the partially concealed position. The present process is then ended once.

In contrast, when it is determined that navigation guidance takes place (S130: YES), the controller 29 acquires navigation information and outputs, to the audio output device 27, guidance information included in the acquired navigation information (S140). The controller 29 then acquires audio information, generates an audio information image from the acquired audio information, and displays the generated audio information image on the exposed portion of the viewing area of the display 26a at the partially concealed position (S150). The present process is then ended once.

Advantage (1) According to the navigation apparatus 20 of the present embodiment, when it is determined in the display image switch process that the display 26a of the display device 26 is stored in the center console portion 30 (S120:YES), the controller 29 acquires audio information, generates an audio information image from the acquired audio information, and displays the generated audio information image on the exposed portion of the viewing area of the display 26a at the partially concealed position (S150). Thus, even when the viewing area of the display 26a is partially concealed by the center console portion 30, useful information such as audio information other than the navigation information can be displayed within a partially exposed portion of the viewing area, which is not concealed by the center console portion 30.

(2) Moreover, according to the navigation apparatus 20 of the present embodiment, when it is determined in the display image switch process that the display 26a of the display device 26 is stored in the center console portion 30 (S120: YES), the controller 29 determines whether navigation guidance takes place (S130). When it is determined that navigation guidance takes place (S130: YES), the controller 29 acquires navigation information and outputs, to the audio output device 27, guidance information included in the acquired navigation information (S140). If the center console portion 30 conceals the viewing area of the display 26a which displays navigation information, it may become impossible to provide the navigation guidance using an image. Even in such a case, the navigation guidance can be continuously provided using audio guidance; thereby, user's convenience can be enhanced.

Modification (1) In the above first embodiment, when it is determined in the display image switch process that the display 26a of the display device 26 is stored in the center console portion 30 (S120:YES), the controller 29 acquires audio information, generates an audio information image from the acquired audio information, and displays the generated audio information image on the exposed portion of the viewing area of the display 26a at the partially concealed position (S150).

However, there is no need of restricting an embodiment to the above. The controller 29 may acquire vehicle information instead of the above-mentioned audio information, and generate an image from the acquired vehicle information for displaying on the partially exposed portion of the viewing area of the display 26a at the partially concealed position.

In addition, examples of vehicle information include a speed of the vehicle, an engine speed value, a room air temperature, an outdoor temperature, and ecological environment related information such as fuel efficiency information and electric charge state information. Such a modified configuration of the present invention can provide the same advantage as that of the above first embodiment.

(2) In the above first embodiment, when it is determined that navigation guidance takes place in the display image switch process (S130:YES), the controller 29 acquires navigation information and outputs, to the audio output device 27, guidance information (i.e., audio guidance) included in the acquired navigation information (S140). However, in such a case, the audio guidance can be changed into more detailed audio guidance. Here, it is required for the guidance information included in the navigation information to include two types of guidance information. That is, first guidance information is for outputting audio guidance when navigation using an image is taking place; second guidance information is for outputting audio guidance when navigation using an image is not taking place. Thus even if navigation guidance using an image cannot be provided, navigation guidance can be provided by using the second guidance information having the detailed information. Therefore, the user's convenience can be raised further.

Second Embodiment

Configuration

A navigation apparatus 20 according to a second embodiment is explained with reference to FIGS. 1, 4, 5A, 5B. A configuration of the navigation apparatus according to the second embodiment is the same as that of the navigation apparatus 20 according to the first embodiment, which is shown in FIG. 1. However, the viewing area of the display 26a of the display device 26 displays images different from those in the first embodiment. Thus, the configuration relative to the different part is explained below.

Like the first embodiment, the controller 29 generates a first image to be displayed on the whole of the viewing area at the fully exposed position and a second image to be displayed on the exposed portion of the viewing area at the partially concealed position of the display 26a in the display device 26. Thus, the controller 29 includes a display image generation means or unit.

In the present second embodiment, while the first image is also a navigation information image (refer to FIG. 5A, which is identical to FIG. 3A), which is generated from the navigation information and the generated first image is displayed on the whole of the viewing area at the fully exposed position.

In contrast, the second image is a "Turn by Turn" image (refer to FIG. 5B) as a navigation information image, which is generated from the navigation information. The "Turn by Turn" image indicates information on travel direction of the vehicle such as going straight or turning right or left which a user of the vehicle requires while driving the vehicle from a present position to a destination. Thus, the controller 29 includes a notification means or unit for displaying an image suitable for the position of the display 26a taking place, like the first embodiment.

Operation

Figure 4:
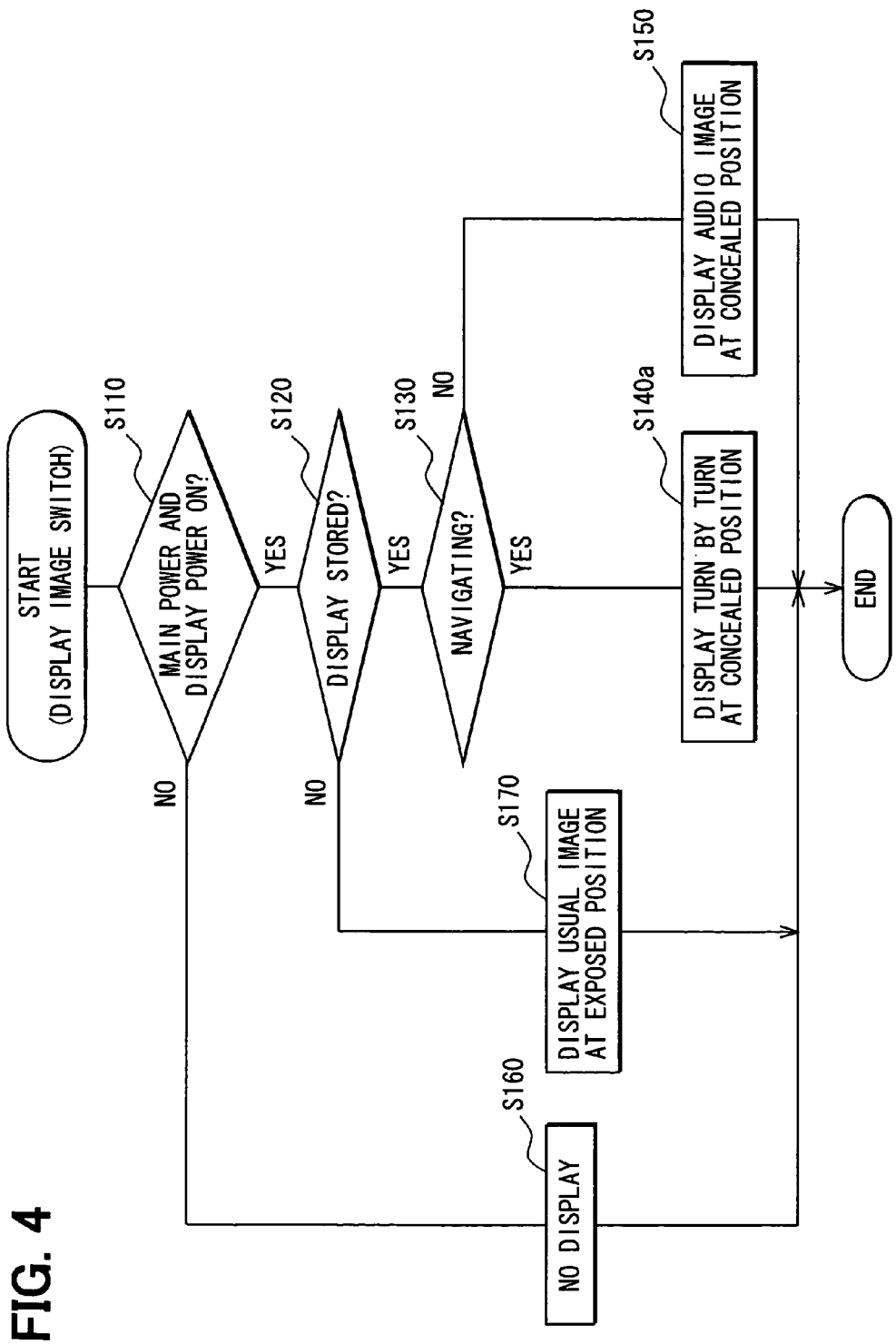
FIG. 4 is a flowchart explaining a display switch process according to a second embodiment of the present invention.
Figure 5A:
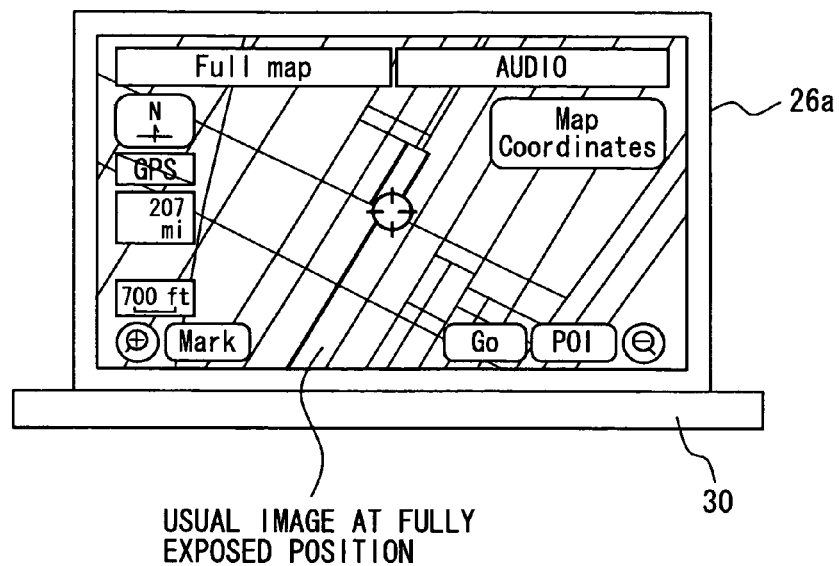
FIG. 5A is an example of an image in a display at a fully exposed position according to the second embodiment.
Figure 5B:
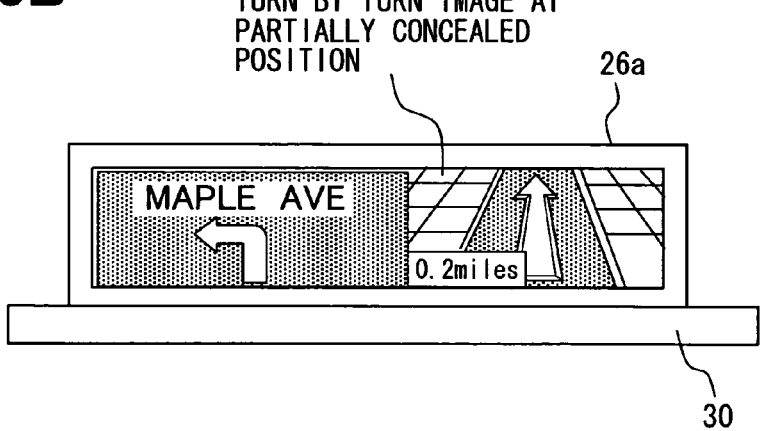
FIG. 5B is an example of an image in a display at a partially concealed position according to the second embodiment.

A display image switch process executed by the controller 29 according to the second embodiment is explained using a flowchart of FIG. 4. The process according to the second embodiment is the same as that of FIG. 2 according to the first embodiment except for processing subsequent to S130. Thus, processing relative to the different part are explained below.

Like the first embodiment, at S120, it is determined in the display image switch process whether the display 26a of the display device 26 is stored in the center console portion 30. When the display 26a of the display device 26 is determined to be stored in the center console portion 30 (S120:YES), the controller 29 determines whether navigation guidance takes place (S130). Whether navigation guidance takes place is determined when navigation information outputted from a component included in the navigation apparatus 20 is available for the controller 29.

When it is determined that navigation guidance takes place (S130: YES), the controller 29 acquires navigation information, generates a "Turn by Turn" image from the acquired navigation information, and displays the generated "Turn by Turn" image on the partially exposed portion of the viewing area of the display 26a (S140a) unlike the first embodiment. The process is then ended once.

In contrast, when it is determined that navigation guidance does not take place (S130: NO), the controller 29 acquires audio information, generates an audio information image from the acquired audio information, and displays the generated audio information image on the exposed portion of the viewing area of the display 26a (S150) like the first embodiment. The present process is then ended once.

Advantage (1) According to the navigation apparatus 20 of the present second embodiment, when in the display image switch process, the display 26a of the display device 26 is determined to be stored in the center console portion 30 (S120:YES) and the navigation guidance is determined to be taking place (S130: YES), the controller 29 acquires navigation information, generates the "Turn by Turn" image from the acquired navigation information, and displays the generated "Turn by Turn" image on the partial exposed portion of the viewing area of the display 26a (S140a). Thus, even when the viewing area of the display 26a is partially concealed by the center console portion 30, displaying of the navigation information can be continued using a partially exposed portion of the viewing area, which is not concealed by the center console portion 30.

Modifications (1) In the above second embodiment, when in the display image switch process, the display 26a of the display device 26 is determined to be stored in the center console portion 30 (S120:YES) and the navigation guidance is determined to be taking place (S130: YES), the controller 29 acquires navigation information, generates the "Turn by Turn" image from the acquired navigation information, and displays the generated "Turn by Turn" image on the partially exposed portion of the viewing area of the display 26a (S140a).

However, there is no need of restricting an embodiment to the above. The controller 29 may acquire audio information instead of the above-mentioned navigation information, and generate an audio information image from the acquired audio information for displaying on the partially exposed portion of the viewing area. The generated audio information image may be then displayed on the partially exposed portion of the viewing area of the display 26a like at Step S150. Here, the audio information image may be defined as a third image in addition to the first and second image. Such a modified configuration of the present invention can provide the same advantage as that of the above second embodiment.

(2) Further, in the above case (1), the controller 29 may acquire vehicle information instead of above-mentioned navigation information. A vehicle information image may be generated from the acquired vehicle information for displaying on the partially exposed portion of the viewing area of the display 26a. The generated vehicle information image may be then displayed on the partially exposed portion of the display 26a. Similarly in the first embodiment, examples of vehicle information include a speed of the vehicle, an engine speed value, a room air temperature, an outdoor temperature, and ecological environment related information such as fuel efficiency information and electric charge state information. Here, the vehicle information image may be also defined as a third image in addition to the first and second image. Such a modified configuration of the present invention can provide the same advantage as that of the above second embodiment.

(3) In the above second embodiment, when in the display image switch process, the display 26a of the display device 26 is determined to be stored in the center console portion 30 (S120:YES) and the navigation guidance is determined to be taking place (S130: YES), the controller 29 acquires navigation information, generates the "Turn by Turn" image from the acquired navigation information, and displays the generated "Turn by Turn" image on the partially exposed portion of the viewing area of the display 26a (S140). In such a case, the audio output device 27 may be caused to output guidance information included in the acquired navigation information.

If the center console portion 30 conceals the viewing area of the display 26a which displays navigation information, a view area for displaying the navigation information or guidance may be limited. Even in such a case, the navigation guidance can be continued using audio guidance. The user's convenience can be raised.

(4) Moreover, in the above, the audio guidance is outputted via the audio output device 27. In such a case, the audio guidance can be changed into more detailed one. Here, it is required for the guidance information included in the navigation information to include two types of guidance information. That is, first guidance information is for outputting audio guidance while navigation using an image is taking place; second guidance information is for outputting audio guidance while navigation using an image is not taking place. Thus even if a viewing area for displaying the navigation guidance is limited, navigation information or guidance can be provided by using the second guidance information including detailed information. Therefore, the user's convenience can be raised further.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:
1. A display apparatus for a vehicle, the apparatus comprising:
　a display including a viewing area able to display an image, the display being movable between (i) a partially concealed position at which the viewing area is partially concealed inside a center console portion of the vehicle and (ii) a fully exposed position at which a whole of the viewing area is exposed from the center console portion;
　a movement drive device configured to move the display between the partially concealed position and the fully exposed position;
　a position switch unit configured to cause the movement drive device to switch to move the display between the partially concealed position and the fully exposed position according to a control signal;
　a first information acquisition unit configured to acquire navigation information for notification, the navigation information including audio guidance information,
　　the audio guidance information including
　　　first audio guidance information used for outputting sounds when navigation using an image is executed and
　　　second audio guidance information used for outputting sounds when navigation using an image is not executed;
　an audio output device configured to output sounds based on the audio guidance information;
　a second information acquisition unit configured to acquire at least one of audio information and vehicle information; and
　an image generation and notification unit configured to determine whether a main power of the display apparatus and a power of the display are set to ON,
　wherein,
　under a condition that it is initially determined that the main power of the display apparatus and the power of the display are set to ON:
　(i) in a case that the display is at the fully exposed position,
　the image generation and notification unit is further configured to
　　generate, from the navigation information acquired by the first information acquisition unit, a first image used for the viewing area at the fully exposed position, and
　　cause the display to display the generated first image on the viewing area at the fully exposed position instead of the viewing area of the partially concealed position;
　(ii) when the navigation information is being acquired by the first information acquisition unit in a case that the display is at the partially concealed position,
　the image generation and notification unit is further configured to
　　generate, from the navigation information acquired by the first information acquisition unit, a second image used for an exposed portion of the viewing area at the partially concealed position, the second image indicating information necessary for a user to confirm a travel direction while driving the vehicle from a present position to a destination, and
　　cause the display to display the generated second image on the exposed portion of the viewing area instead of an unexposed portion of the viewing area at the partially concealed position while causing the audio output device to output sounds based on the second audio guidance information included in the acquired navigation information; and
　(iii) when the navigation information is not being acquired by the first information acquisition unit in the case that the display is at the partially concealed position,
　the image generation and notification unit is further configured to
　　generate, from the at least one of audio information and vehicle information acquired by the second informa- tion acquisition unit, a third image used for the exposed portion of the viewing area at the partially concealed position, and cause the display to display the generated third image instead of the generated second image on the exposed portion of the viewing area instead of the unexposed portion of the viewing area at the partially concealed position.

2. The display apparatus according to claim 1, wherein under a condition that it is first determined that at least one of the main power of the display apparatus and the power of the display is not set to ON, the image generation and notification unit is further configured to cause the display not to display any image.

3. The display apparatus according to claim 1, the generated second image and the generated third image being limited to display on the exposed portion of the viewing area at the partially concealed position.

4. The display apparatus according to claim 1, the generated first image being displayed on the whole of the viewing area at the fully exposed position.

5. The display apparatus according to claim 1, the generated first image being displayed on the whole of the viewing area at the fully exposed position, the generated second image and the generated third image being limited to display on the exposed portion of the viewing area at the partially concealed position.

* * * * *